US012657874B2

(12) United States Patent
Nehama et al.

(10) Patent No.: US 12,657,874 B2
(45) Date of Patent: Jun. 16, 2026

(54) MACHINE LEARNING PROCESS AND METHOD OF TARGETED CLUSTERING BASED ON SINGLE SHOT SAMPLING

(71) Applicant: AUTOBRAINS TECHNOLOGIES LTD, Tel Aviv-Jaffa (IL)

(72) Inventors: Shani Nehama, Afek (IL); Igal Raichelgauz, Tel Aviv (IL)

(73) Assignee: AUTOBRAINS TECHNOLOGIES LTD, Tel Aviv (IL)

( * ) Notice: Subject to any disclaimer, the term of this patent is extended or adjusted under 35 U.S.C. 154(b) by 267 days.

(21) Appl. No.: 18/504,083

(22) Filed: Nov. 7, 2023

(65) Prior Publication Data

US 2025/0148755 A1     May 8, 2025

(51) Int. Cl.
*G06V 10/764* (2022.01)
*G06V 20/56* (2022.01)

(52) U.S. Cl.
CPC ............ *G06V 10/764* (2022.01); *G06V 20/56* (2022.01)

(58) Field of Classification Search
CPC ....... G06V 10/764; G06V 20/56; G06V 20/58
See application file for complete search history.

(56) References Cited

U.S. PATENT DOCUMENTS

| | | | | |
|---|---|---|---|---|
| 8,995,758 | B1 * | 3/2015 | Bissacco ................ | G06Q 30/06 382/181 |
| 11,176,403 | B1 * | 11/2021 | Singh ...................... | G06V 10/82 |
| 12,211,090 | B1 * | 1/2025 | Karumuri .......... | G06Q 30/0643 |
| 2022/0111874 | A1 * | 4/2022 | Stimpson ............... | G06V 20/58 |
| 2022/0139552 | A1 * | 5/2022 | Binder ................... | G16H 30/40 705/2 |
| 2023/0351009 | A1 * | 11/2023 | Wright .................... | G06F 21/50 |
| 2023/0385839 | A1 * | 11/2023 | Nadi .................. | G06Q 20/4016 |
| 2024/0087287 | A1 * | 3/2024 | Shreve ............... | G06V 10/7753 |
| 2025/0102626 | A1 * | 3/2025 | Monninger ........... | G01S 13/931 |

* cited by examiner

*Primary Examiner* — John B Strege
(74) *Attorney, Agent, or Firm* — RECHES PATENTS

(57) ABSTRACT

A method for improving an accuracy of object classification, the method includes: (i) receiving, by a machine learning process, information regarding an environment of a vehicle; (ii) classifying, by the machine learning process, an object that is located within the environment of the vehicle to a certain class; wherein the machine learning process was trained by a training process to classify objects while avoiding false positive (FP) errors that are represented by different FP data sets that are fed to the machine learning process during the training process, the different FP data sets are associated with different classes; wherein for each class of the different classes, a FP data set that is associated with the class comprises FP data sub-sets that are associated with different objects that were mistakenly classified to the class; and outputting an outcome of the classification for use in navigating the vehicle.

11 Claims, 6 Drawing Sheets

Figure 1:
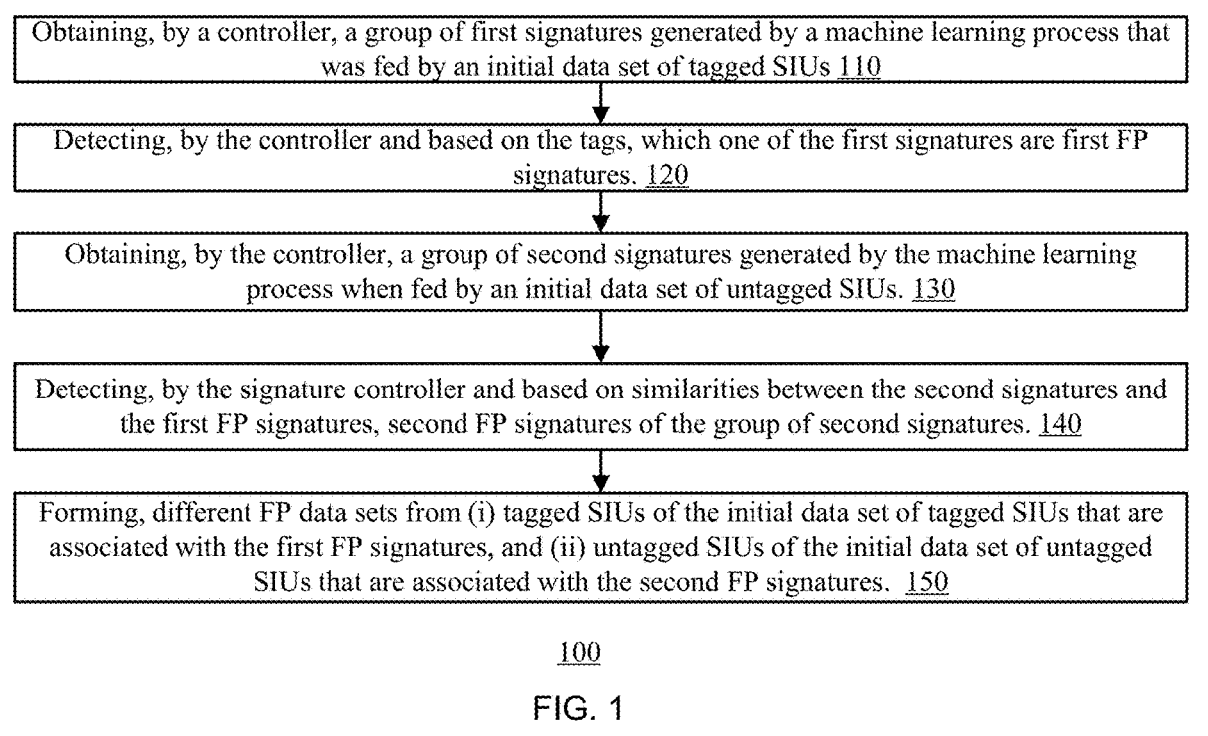

Obtaining, by a controller, a group of first signatures generated by a machine learning process that was fed by an initial data set of tagged SIUs 110

Detecting, by the controller and based on the tags, which one of the first signatures are first FP signatures. 120

Obtaining, by the controller, a group of second signatures generated by the machine learning process when fed by an initial data set of untagged SIUs. 130

Detecting, by the signature controller and based on similarities between the second signatures and the first FP signatures, second FP signatures of the group of second signatures. 140

Forming, different FP data sets from (i) tagged SIUs of the initial data set of tagged SIUs that are associated with the first FP signatures, and (ii) untagged SIUs of the initial data set of untagged SIUs that are associated with the second FP signatures. 150

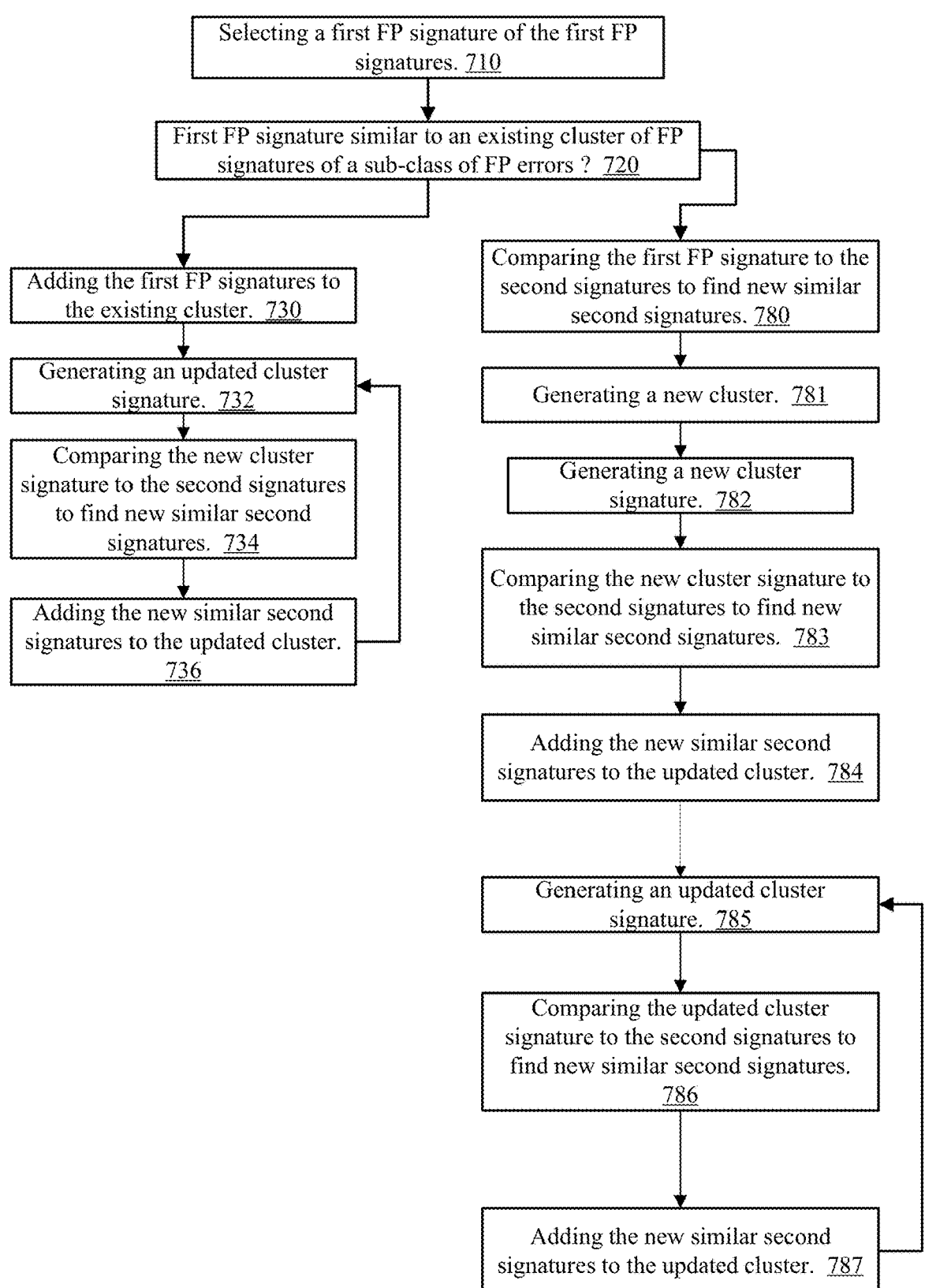

Selecting a first FP signature of the first FP signatures. 710

First FP signature similar to an existing cluster of FP signatures of a sub-class of FP errors ? 720

Adding the first FP signatures to the existing cluster. 730

Generating an updated cluster signature. 732

Comparing the new cluster signature to the second signatures to find new similar second signatures. 734

Adding the new similar second signatures to the updated cluster. 736

Comparing the first FP signature to the second signatures to find new similar second signatures. 780

Generating a new cluster. 781

Generating a new cluster signature. 782

Comparing the new cluster signature to the second signatures to find new similar second signatures. 783

Adding the new similar second signatures to the updated cluster. 784

Generating an updated cluster signature. 785

Comparing the updated cluster signature to the second signatures to find new similar second signatures. 786

Adding the new similar second signatures to the updated cluster. 787

Figures 3, 4:
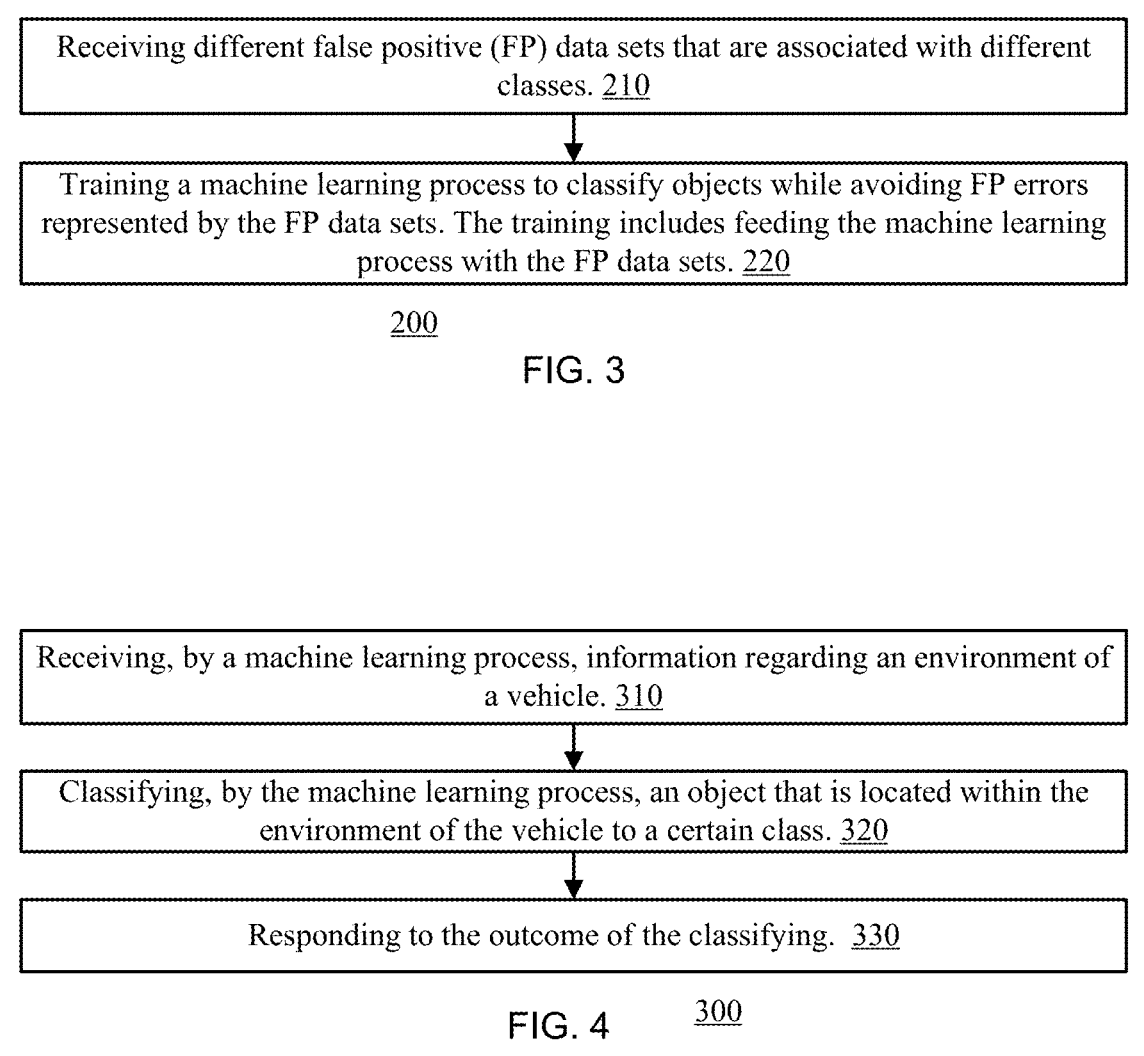

Receiving different false positive (FP) data sets that are associated with different classes. 210

Training a machine learning process to classify objects while avoiding FP errors represented by the FP data sets. The training includes feeding the machine learning process with the FP data sets. 220

Receiving, by a machine learning process, information regarding an environment of a vehicle. 310

Classifying, by the machine learning process, an object that is located within the environment of the vehicle to a certain class. 320

Responding to the outcome of the classifying. 330

FIG. 4          300

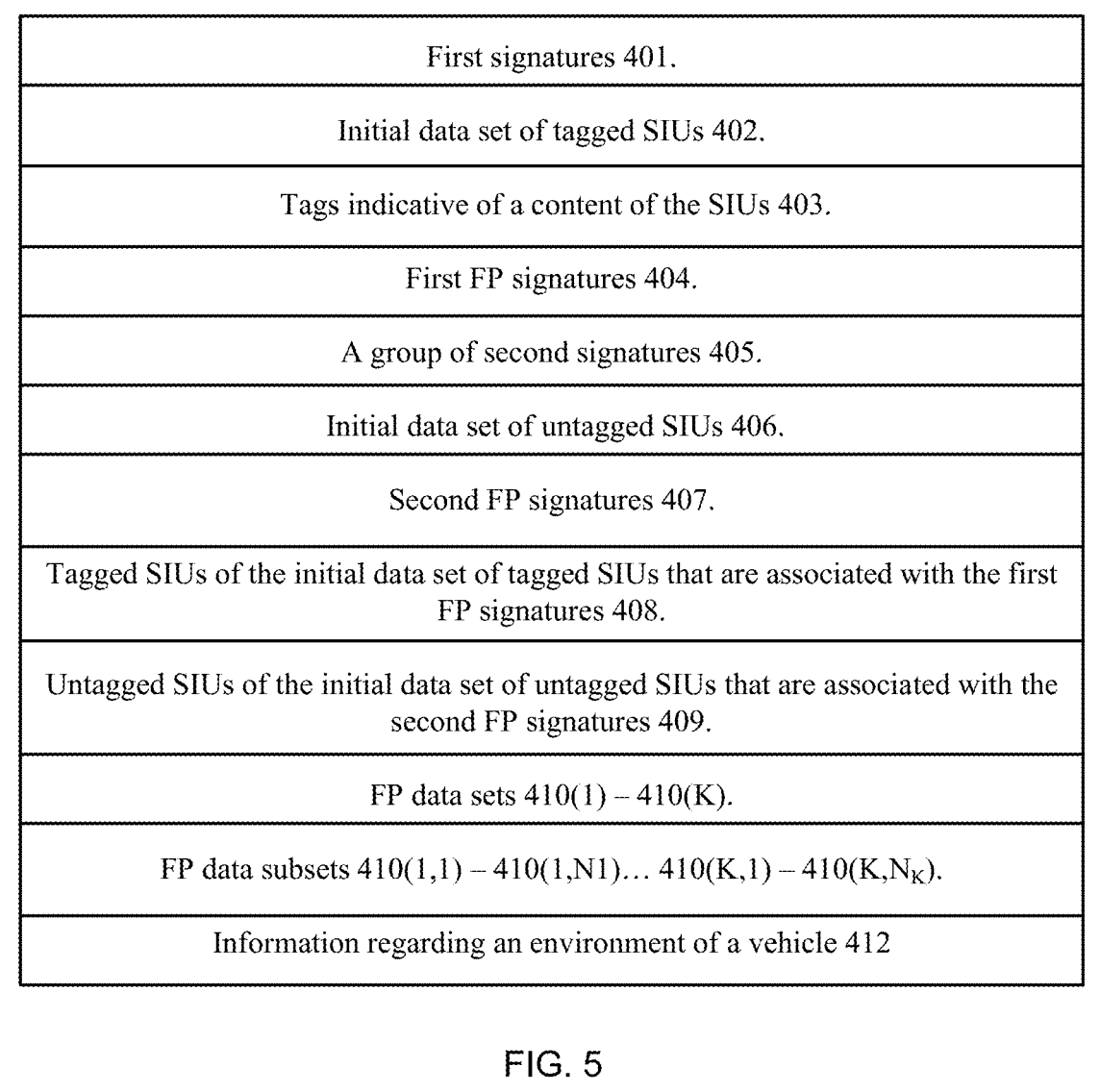

| First signatures 401. |
|---|
| Initial data set of tagged SIUs 402. |
| Tags indicative of a content of the SIUs 403. |
| First FP signatures 404. |
| A group of second signatures 405. |
| Initial data set of untagged SIUs 406. |
| Second FP signatures 407. |
| Tagged SIUs of the initial data set of tagged SIUs that are associated with the first FP signatures 408. |
| Untagged SIUs of the initial data set of untagged SIUs that are associated with the second FP signatures 409. |
| FP data sets 410(1) – 410(K). |
| FP data subsets 410(1,1) – 410(1,N1)… 410(K,1) – 410(K,N$_K$). |
| Information regarding an environment of a vehicle 412 |

FIG. 5

MACHINE LEARNING PROCESS AND METHOD OF TARGETED CLUSTERING BASED ON SINGLE SHOT SAMPLING

BACKGROUND

Object classification is a key building block of all modern autonomous vehicles (AV) and advanced driving assistance system (ADAS) solutions.

Object classification may be based on machine learning processes.

Despite unparalleled investments in object classification that is based on machine learning processes, the accuracy of such solutions is not high enough.

There is a growing need to improve the accuracy of object classification that is based on machine learning processes.

BRIEF DESCRIPTION OF THE DRAWINGS

The embodiments of the disclosure will be understood and appreciated more fully from the following detailed description, taken in conjunction with the drawings in which:

FIG. 1 illustrates an example of a method;

FIG. 2 illustrates an example of a method;

FIG. 3 illustrates an example of a method;

FIG. 4 illustrates an example of a method;

FIG. 5 illustrates an example of various information elements and/or SIUs;

DESCRIPTION OF EXAMPLE EMBODIMENTS

Figure 6:
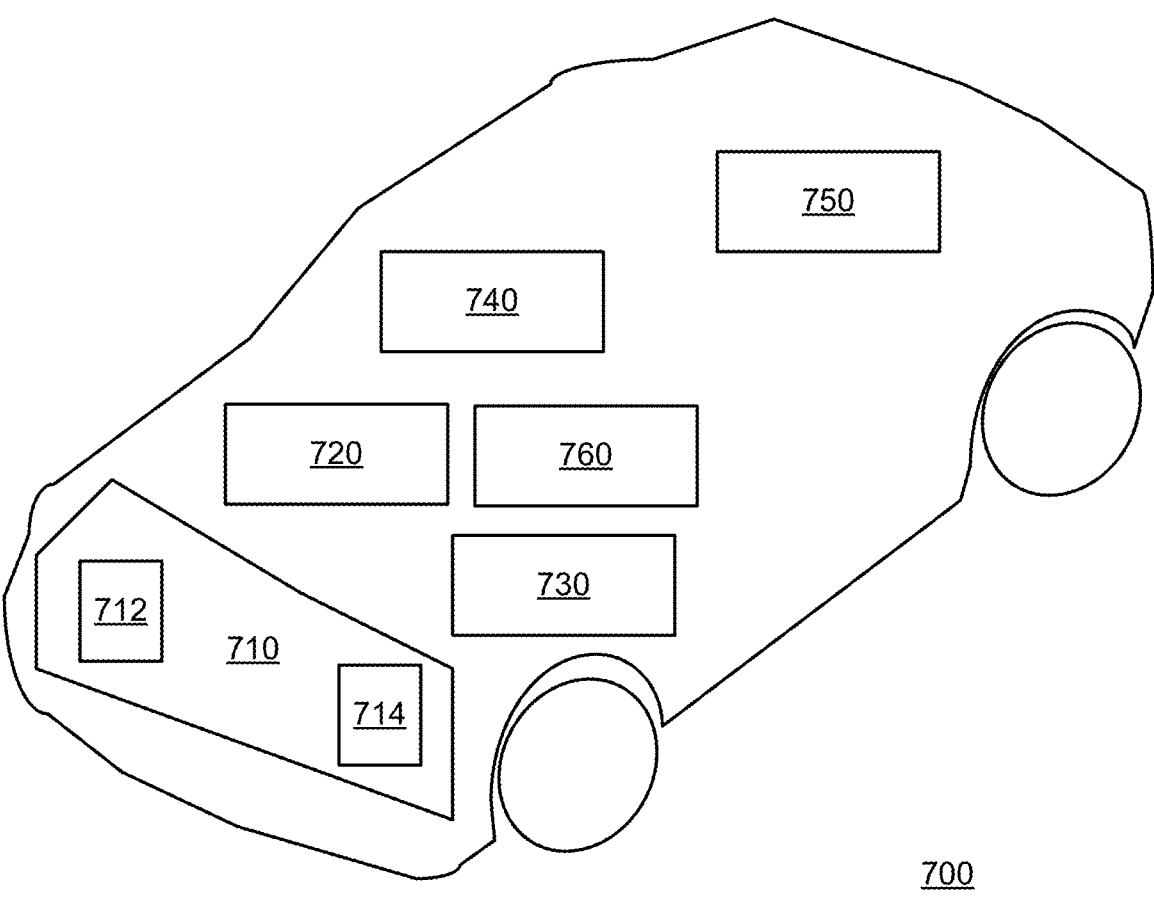
FIG. 6 illustrates an example of a vehicle.
Figure 7:
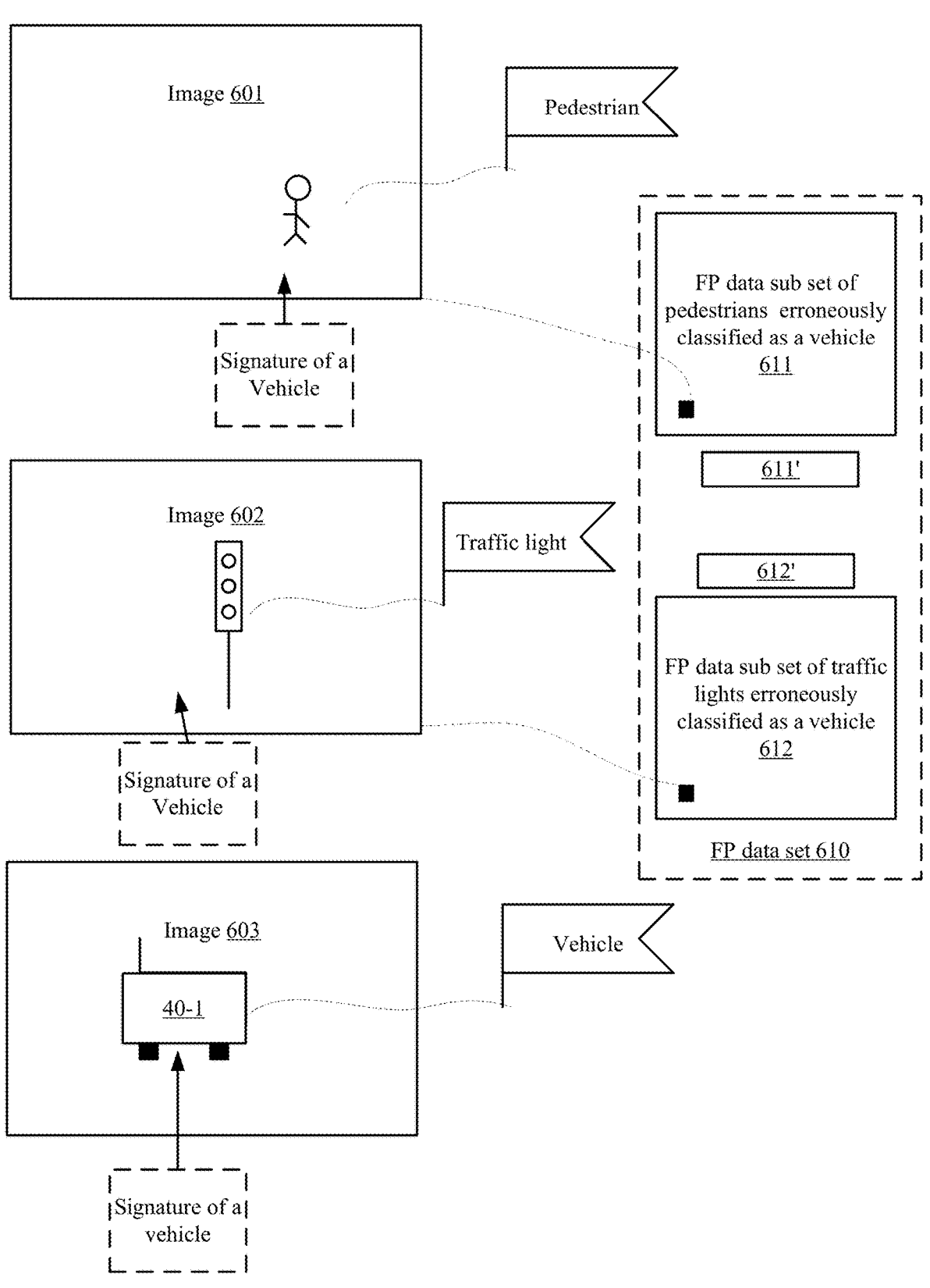
FIG. 7 illustrates examples of images.

A false positive error is a classification error that involves mistakenly classifying an object as belonging to a specified class—when the object does not belong to the specified class. For example—identifying a traffic light as a pedestrian.

According to an embodiment, a training process is provided and includes inserting labelled data, that is labelled with false positive scenarios. The more the machine learning process is trained with pointed false positive scenarios, the better the machine learning process is later optimized to generally handling false positives.

The outcome of the training provides a trained machine learning process that will automatically determine an image as false positive and of which type, i.e. of which clustering (i.e. red cone; tar line—false detection lane marking; false detection road boundary; etc).

According to an embodiment, there is provided a method that is computer implemented and is for improving an accuracy of object classification, while optimizing cost.

The method is implemented using a machine learning process that was trained to avoid false positive (FP) errors that are represented by different FP data sets. The different FP data sets are associated with different classes. For each class of the different classes, a FP data set that is associated with the class includes FP data sub-sets that are associated with different objects that were mistakenly classified to the class—and are associated with different FP sub-classes. For example—FP resulting from erroneously classifying a vehicle as a pedestrian are a first sub-class of FP errors, FP resulting from FP resulting from erroneously classifying a traffic light as a pedestrian are a second sub-class of FP errors—and both sub-classes are including a FP class related to a FP error that involved erroneously classifying other objects as a pedestrian.

According to an invention each FP data subset is associated with FP data subset metadata that indicated the nature of the FP error related to the FP data subset (for example—the FP data subset represents a FP error in which an object of a specified class was erroneously classified to another specified class). According to an embodiment, the FP data subset metadata is utilized during the training process for training the machine learning process to avoid from making the FP error associated with the FP data subset.

Using different FP data subsets that are associated with different objects that triggered the FP error improves the accuracy of the training—as different FP errors (different misclassifications) are identified and dealt with separately during the training process.

According to an embodiment, the accuracy of the object classification is further improved by increasing the number of sensed information units (SIUs) included in the different PF data sets—without paying the penalty (for example cost, compute processing) associated with supervised learning (as most of the SIUs involved in the process are untagged images—as tagging is costly)—therefore benefiting from the benefits of both supervised and unsupervised learning.

Supervised learning uses tagged images that identify objects captured in SIUs of a supervised learning training data set that are fed to a machine learning process during the supervised learning training. Supervised learning is regarded as more accurate that unsupervised learning but more costly. Increasing the number of SIUs also solves the problem of having a limited training data set that captures only a limited number of objects—which results in a limited ability to identifying rare objects and/or rare scenarios that may lead to errors.

FIG. 1 is an example of a method 100 for generating different data FP data sets.

According to an embodiment, method 100 includes step 110 of obtaining, by a controller, a group of first signatures generated by a machine learning process that was fed by an initial data set of tagged SIUs. The tagged SIUs are associated with tags indicative of a content of the SIUs. Step 110 includes receiving the outcome of a supervised learning process.

According to an embodiment, step 110 is followed by step 120 of detecting, by the controller and based on the tags, which one of the first signatures are first FP signatures. The detecting is based on a comparison between the (i) the classes of objects captured in the tagged SIU—according to the tags, and (ii) the classes of the objects captured in the tagged SIUs—according to the first signatures.

According to an embodiment, step 120 includes associating location information (indictive of the locations of the objects associated with the FP signatures) with the FP signatures.

The first FP signatures are associated with tagged SIUs of the initial data set of tagged SIUs.

According to an embodiment, detecting which one of the signatures are false positive signatures (step 120) involves associating a correct class to each FP signature (according to the tag), and associating an erroneous class (according to the signature).

According to an embodiment, method 100 includes step 130 of obtaining, by the controller, a group of second signatures generated by the machine learning process when fed by an initial data set of untagged SIUs. Step 130 includes receiving the outcome of an unsupervised learning process.

According to an embodiment, it is beneficial to have an initial data set of untagged SIUs that is diverse—in the sense that the untagged SIUs capture different situations and/or different environments and/or different locations and/or different weather conditions and/or different lighting conditions and/or the like.

The number of SIUs of the initial data set of the untagged SIUs exceeds (for example by a factors of at least 2, 10, 50, 100, 500, 1000 and even more) the number of SIUs of the initial data set of the tagged SIUs.

According to an embodiment, detecting which one of the signatures are false positive signatures (step 120) and obtaining a group of second signatures (step 130) are followed by step 140 of detecting, by the signature controller and based on similarities between the second signatures and the first FP signatures, second FP signatures of the group of second signatures. The second FP signatures are associated with untagged SIUs of the initial data set of untagged SIUs.

According to an embodiment, detecting second false positive signatures (step 140) is followed by step 150 of forming, different FP data sets from (i) tagged SIUs of the initial data set of tagged SIUs that are associated with the first FP signatures, and (ii) untagged SIUs of the initial data set of untagged SIUs that are associated with the second FP signatures. The different FP data sets are associated with different classes. For each class of the different classes, a FP data set that is associated with the class includes FP data sub-sets that are associated with different objects that were mistakenly classified to the class. According to an embodiment, each FP data sub-set is associated with a sub-class of FP errors.

According to an embodiment, each FP data set is associated with a correct class of the object and different FP data subsets of the FP data set are associated with different classes of objects that were erroneously classified as being of the correct class. For example, referring to FIG. 6:

a. Top image 601 captures a pedestrian that was erroneously classified as a vehicle ("signature of a vehicle")—then the top image belongs to FP data sub set 611 of images that captured pedestrians but were erroneously classified as a vehicle. This is a first sub-class of FP errors. According to an embodiment, FP data sub set 611 is a cluster and is associated with a FP data sub set cluster signature 611'.

b. Middle image 602 captures a traffic light that was erroneously classified as a vehicle ("signature of a vehicle"). This is a second sub-class of FP errors. The middle image belongs to FP data sub set 612 of images that captured traffic lights but were erroneously classified as a vehicle. According to an embodiment, FP data sub set 612 is a cluster and is associated with a FP data sub set cluster signature 612'.

c. Bottom image 603 captured a vehicle that was classified as a vehicle.

d. FP data sub set 611 and FP data sub set 612 belong to a vehicle FP data set 610.

According to an embodiment, the detection of second FP signatures (step 140) is executed in an iterative manner—and per each sub-class of FP errors. Each sub-class of FP errors is represented by a cluster and a cluster signature.

According to an embodiment, the search second FP signatures is executed in an iterative manner (see FIG. 2), and includes:

a. Selecting (step 710) a first FP signature of the first FP signatures.

b. Determining (step 720) whether the first FP signature is similar to an existing cluster of FP signatures of a sub-class of FP errors.

c. If YES—(i) adding (step 730) the first FP signatures to the existing cluster, (ii) generating (step 732) an updated cluster signature, and (iii) comparing (step 734) the updated cluster signature to the second signatures to find new similar second signatures, (iv) adding the new similar second signatures to the updated cluster, and jumping to (ii). Repeating (i)-(iv) till a reaching an end criterion. According to an embodiment an end criterion is selected out of a maximal number or iteration or fulfilling a convergence criterion.

d. If NO—(a) comparing (step 780) the first FP signature to the second signatures to find similar second signatures, (b) generating (step 781) a new cluster, (c) generating (step 782) a new cluster signature, (d) comparing (step 783) the new cluster signature to the second signatures to find new similar second signatures, (e) adding (step 784) the new similar second signatures to the new cluster to provide an updated cluster, (f) generating (step 785) an updated cluster signature, (g) comparing (step 786) the updated cluster signature to the second signatures to find new similar second signatures, (h) adding (step 787) the new similar second signatures to the updated cluster, and jumping to (f). Repeating (f)-(h) till a reaching an end criterion.

FIG. 3 is an example of a method 200 for training a machine learning process.

According to an embodiment, method 200 includes step 210 receiving different false positive (FP) data sets that are associated with different classes. For each class of the different classes, a FP data set that is associated with the class comprises FP data sub-sets that are associated with different objects that were mistakenly classified to the class.

According to an embodiment, the different FP data sets are generated by step 100.

According to an embodiment, step 210 is followed by step 220 of training a machine learning process to classify objects while avoiding FP errors represented by the FP data sets. The training includes feeding the machine learning process with the FP data sets—and indicating that the FP datasets represent FP errors—especially specifying the correct classes and erroneous classes associated with each FP data sub set.

FIG. 4 is an example of a method 300 for improving an accuracy of object classification.

According to an embodiment, method 300 includes step 310 of receiving, by a machine learning process, information regarding an environment of a vehicle.

According to an embodiment, the information regarding the environment is one or more sensed information units (SIUs).

According to an embodiment, the information regarding the environment is an outcome of processing the one or more SIUs.

According to an embodiment, the one or more SIUs are sensed by one or more sensors of the vehicle.

According to an embodiment, step 310 is followed by step 320 of classifying, by the machine learning process, an object that is located within the environment of the vehicle to a certain class.

The machine learning process was trained by a training process to classify objects while avoiding false positive (FP) errors that are represented by different FP data sets that are fed to the machine learning process during the training process. The different FP data sets are associated with different classes. For each class of the different classes, a FP data set that is associated with the class includes FP data sub-sets that are associated with different objects that were mistakenly classified to the class.

According to an embodiment, step 320 is followed by step 330 of responding to the outcome of the classifying.

According to an embodiment, step 330 includes outputting the outcome of the classification. The outcome of the classification (a class of an object and optically the location of the object) may be of use one or more out of navigating the vehicle, performing an autonomous driving of the vehicle, performing an ADAS operation, triggering a navigating the vehicle, triggering an autonomous driving of the vehicle, triggering an ADAS operation, and the like.

According to an embodiment the responding includes at least one of: sending one or more classification results to one or more vehicle units such as vehicle computers, AV unit configured to control autonomous driving of the vehicle, ADAS unit configured to control ADAS operations, a navigation unit configured to determine how to navigate the vehicle given the classification results, a resource controller configured to allocate resources to different tasks executed by the vehicle, and the like.

FIG. 5 illustrates an example of various information elements and/or SIUs such as first signatures 401, initial data set of tagged SIUs 402, tags indicative of a content of the SIUs 403, first FP signatures 404, a group of second signatures 405, initial data set of untagged SIUs 406, second FP signatures 407, tagged SIUs of the initial data set of tagged SIUs that are associated with the first FP signatures 408, untagged SIUs of the initial data set of untagged SIUs that are associated with the second FP signatures 409, FP data sets 410(1)-410(K), FP data subsets 410(1,1)-410(1,N1) . . . 410(K,1)-410(K,NK), and information regarding an environment of a vehicle 412.

FIG. 6 illustrates an example of a vehicle 700. Vehicle 700 includes a vehicle sending unit 710 that may include one or more sensors such as vehicle sensors 712 and 714. Vehicle 700 also includes one or more processing circuits denoted 720, memory unit 730, communication unit 740, and one or more vehicle units (collectively denoted 750) such as one or more vehicle computers, units controlled by the one or more vehicle units, motor units, chassis, wheels, and the like. The one or more processing circuits are configured to execute any of the methods illustrated in this application.

According to an embodiment, the memory unit stores one or more of the various information elements and/or SIUs of FIG. 5.

In the foregoing detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

Any one of the units and/or modules that are illustrated in the application, may be implemented in hardware and/or code, instructions and/or commands stored in a non-transitory computer readable medium, may be included in a vehicle, outside a vehicle, in a mobile device, in a server, and the like.

The vehicle may be any type of vehicle—for example a ground transportation vehicle, an airborne vehicle, or a water vessel.

The specification and/or drawings may refer to an image. An image is an example of a media unit. Any reference to an image may be applied mutatis mutandis to a media unit. A media unit may be an example of sensed information unit (SIU). Any reference to a media unit may be applied mutatis mutandis to any type of natural signal such as but not limited to signal generated by nature, signal representing human behavior, signal representing operations related to the stock market, a medical signal, financial series, geodetic signals, geophysical, chemical, molecular, textual and numerical signals, time series, and the like. Any reference to a media unit may be applied mutatis mutandis to a sensed information unit (SIU). The SIU may be of any kind and may be sensed by any type of sensors—such as a visual light camera, an audio sensor, a sensor that may sense infrared, radar imagery, ultrasound, electro-optics, radiography, LIDAR (light detection and ranging), a thermal sensor, a passive sensor, an active sensor, etc. The sensing may include generating samples (for example, pixel, audio signals) that represent the signal that was transmitted, or otherwise reach the sensor. The SIU may be one or more images, one or more video clips, textual information regarding the one or more images, text describing kinematic information about an object, and the like.

Object information may include any type of information related to an object such as but not limited to a location of the object, a behavior of the object, a velocity of the object, an acceleration of the object, a direction of a propagation of the object, a type of the object, one or more dimensions of the object, and the like. The object information may be a raw SIU, a processed SIU, text information, information derived from the SIU, and the like.

An obtaining of object information may include receiving the object information, generating the object information, participating in a processing of the object information, processing only a part of the object information and/or receiving only another part of the object information.

The obtaining of the object information may include object detection or may be executed without performing object detection.

A processing of the object information may include at least one out of object detection, noise reduction, improvement of signal to noise ratio, defining bounding boxes, and the like.

The object information may be received from one or more sources such as one or more sensors, one or more communication units, one or more memory units, one or more image processors, and the like.

The object information may be provided in one or more manners—for example in an absolute manner (for example—providing the coordinates of a location of an object), or in a relative manner—for example in relation to a vehicle (for example the object is located at a certain distance and at a certain angle in relation to the vehicle.

The vehicle is also referred to as an ego-vehicle.

The specification and/or drawings may refer to a processor or to a processing circuit.

According to an embodiment, a processor is or includes one or more processing circuits. According to an embodiment, A processing circuit is implemented as a central processing unit (CPU) and/or as one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

Any reference to an object may be applicable to a pattern. Accordingly—any reference to object detection is applicable mutatis mutandis to a pattern detection.

In the foregoing specification, the invention has been described with reference to specific examples of embodiments of the invention. It will, however, be evident that various modifications and changes may be made therein without departing from the broader spirit and scope of the invention as set forth in the appended claims. Moreover, the terms "front," "back," "top," "bottom," "over," "under" and the like in the description and in the claims, if any, are used for descriptive purposes and not necessarily for describing permanent relative positions.

Any reference to "comprising" should be applied, mutatis mutandis, to "consisting".

Any reference to "comprising" should be applied, mutatis mutandis, to "consisting essentially of".

It is understood that the terms so used are interchangeable under appropriate circumstances such that the embodiments of the invention described herein are, for example, capable of operation in other orientations than those illustrated or otherwise described herein. Furthermore, the terms "assert"

or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality. Any arrangement of components to achieve the same functionality is effectively "associated" such that the desired functionality is achieved.

Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality. Furthermore, those skilled in the art will recognize that boundaries between the above described operations are merely illustrative. The multiple operations may be combined into a single operation, a single operation may be distributed in additional operations and operations may be executed at least partially overlapping in time.

Moreover, alternative embodiments may include multiple instances of a particular operation, and the order of operations may be altered in various other embodiments. Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense. In the claims, any reference signs placed between parentheses shall not be construed as limiting the claim. The word 'comprising' does not exclude the presence of other elements or steps then those listed in a claim.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The mere fact that certain measures are recited in mutually different claims does not indicate that a combination of these measures cannot be used to advantage. While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination. It will be appreciated by people skilled in the art that the embodiments of the disclosure are not limited by what has been particularly shown and described hereinabove. Rather the scope of the embodiments of the disclosure is defined by the appended claims and equivalents thereof.

What is claimed is:

1. A method that is computer implemented and is for improving an accuracy of object classification, the method comprises:

receiving, by a machine learning process, information regarding an environment of a vehicle; classifying, by the machine learning process, an object that is located within the environment of the vehicle to a certain class; wherein the machine learning process was trained by a training process to classify objects while avoiding false positive (FP) errors that are represented by different FP data sets that are fed to the machine learning process during the training process, the different FP data sets are associated with different classes; wherein for each class of the different classes, a FP data set that is associated with the class comprises FP data sub-sets that are associated with different objects that were mistakenly classified to the class; and outputting an outcome of the classification for use in navigating the vehicle wherein each FP data set that is associated with a class is generated by: obtaining first signatures that were found to be first FP signature during a supervised learning process and are associated with the class; obtaining second FP signatures that were generated during an unsupervised learning process and were found to be similar to the first FP signatures; and including sensed information units (SIUs) represented by the first FP signatures and SIUs represented by the second FP signatures within the FP data set.

2. The method according to claim 1, wherein the classifying comprises avoiding making the FP errors that are represented by the different FP data sets.

3. The method according to claim 1, comprising finding at least one new FP error.

4. The method according to claim 3, comprising retraining the machine learning process with a new data set that represents the new FP error.

5. The method according to claim 1, comprising executing the training process.

6. A non-transitory computer readable medium storing instructions that, when executed by at least one processor, cause the at least one processor to perform operations for improving an accuracy of object classification, comprising:

receiving, by a machine learning process, information regarding an environment of a vehicle; classifying, by the machine learning process, an object that is located within the environment of the vehicle to a certain class; wherein the machine learning process was trained by a training process to classify objects while avoiding false positive (FP) errors that are represented by different FP data sets that are fed to the machine learning process during the training process, the different FP data sets are associated with different classes; wherein for each class of the different classes, a FP data set that is associated with the class comprises FP data sub-sets that are associated with different objects that were mistakenly classified to the class; and outputting an outcome of the classification for use in navigating the vehicle, wherein each FP data set that is associated with a class is generated by: obtaining first signatures that were found to be first FP signature during a supervised learning process and are associated with the class; obtaining second signatures that were generated during an unsupervised learning process and were found to be similar to the first signatures; and including sensed information units (SIUs) represented by the first signatures and SIUs represented by the second signatures within the FP data set.

7. The non-transitory computer readable medium according to claim 6, wherein the classifying comprises avoiding making the FP errors that are represented by the different FP data sets.

8. The non-transitory computer readable medium according to claim 6, further storing instructions for finding at least one new FP error.

9. The non-transitory computer readable medium according to claim 8, further storing instructions for retraining the machine learning process with a new data set that represents the new FP error.

10. The non-transitory computer readable medium according to claim 6, further storing instructions for executing the training process.

11. A method for improving an accuracy of object classification, the method comprises: receiving different false positive (FP) data sets that are associated with different classes; wherein for each class of the different classes, a FP data set that is associated with the class comprises FP data sub-sets that are associated with different objects that were mistakenly classified to the class; and training a machine learning process to classify objects while avoiding FP errors represented by the FP data sets, wherein the training comprises feeding the machine learning process with the FP data sets wherein each FP data set that is associated with a class is generated by: obtaining first signatures that were found to be first FP signature during a supervised learning process and are associated with the class; obtaining second FP signatures that were generated during an unsupervised learning process and were found, during an iterative process to belong to FP clusters having FP cluster signatures that are similar to the first signatures; and including sensed information units (SIUs) represented by the first signatures and SIUs represented by the second signatures within the FP data set.

* * * * *